United States Patent
Calka

(10) Patent No.: US 9,868,657 B2
(45) Date of Patent: Jan. 16, 2018

(54) CONSTRUCTED WETLAND SEWAGE TREATMENT SYSTEM

(71) Applicant: RBC EKO Robert Calka, Pilawa (PL)

(72) Inventor: Robert Calka, Warsaw (PL)

(73) Assignee: RBC EKO Robert Calka, Pilawa (PL)

( * ) Notice: Subject to any disclaimer, the term of this patent is extended or adjusted under 35 U.S.C. 154(b) by 133 days.

(21) Appl. No.: 15/057,303

(22) Filed: Mar. 1, 2016

(65) Prior Publication Data

US 2016/0176733 A1 Jun. 23, 2016

Related U.S. Application Data

(63) Continuation of application No. PCT/PL2015/000042, filed on Mar. 14, 2015.

(30) Foreign Application Priority Data

Apr. 25, 2014 (PL) .......................................... 408014

(51) Int. Cl.
*C02F 3/32* (2006.01)
*C02F 3/10* (2006.01)
*C02F 3/28* (2006.01)

(52) U.S. Cl.
CPC .............. *C02F 3/327* (2013.01); *C02F 3/101* (2013.01); *C02F 3/288* (2013.01); *C02F 2203/00* (2013.01); *C02F 2203/006* (2013.01); *Y02W 10/15* (2015.05); *Y02W 10/18* (2015.05)

(58) Field of Classification Search
None
See application file for complete search history.

(56) References Cited

U.S. PATENT DOCUMENTS

| 4,415,450 A | 11/1983 | Wolverton |
| 8,252,182 B1 | 8/2012 | Chang et al. |

FOREIGN PATENT DOCUMENTS

| CN | 202054672 U | 11/2011 |
| CN | 202337724 U | 7/2012 |
| CN | 102923857 A | 2/2013 |
| CN | 203513364 U | 4/2014 |
| PL | 198680 B1 | 6/2002 |

OTHER PUBLICATIONS

International Search Report, dated Jun. 24, 2015, with Written Opinion for corresponding International Application PCT/PL2015/000042.

*Primary Examiner* — Chester T Barry
(74) *Attorney, Agent, or Firm* — Myers Wolin, LLC

(57) ABSTRACT

A system comprises a rotting sedimentation tank with a particulate solids filter, a distribution well, an exposed reservoir with drainage of PVC pipes and insulation of PVC foil, and an inspection well at the reservoir outlet. The reservoir is filled with layers of gravel and sand, planted with hydrophilic vegetation. The filter bed is composed of three layers, the bottom layer filled with coarse-grained oval gravel, in which the dispersal drain is at ⅔ of the height connected with a supply pipe to the distribution well and terminated with the ventilation chimney, the intermediate layer filled with fine-grained oval gravel, and the top layer filled with sand, in which the collecting drain with an outlet to the inspection well is laid. The level of the sewage in the rotting sedimentation tank is located below the level of the collecting drain.

10 Claims, 1 Drawing Sheet

CONSTRUCTED WETLAND SEWAGE TREATMENT SYSTEM

CROSS REFERENCE TO RELATED APPLICATIONS

This application is a continuation under 35 U.S.C. §120 of International Application PCT/PL2015/000042, filed Mar. 14, 2015, which claims priority to Polish Application PL408014, filed Apr. 25, 2014, the contents of each of which are incorporated by reference herein.

FIELD OF THE INVENTION

The object of the invention is a constructed wetland sewage treatment system with ground and root filter, designed for natural treatment of communal sewage as a local community or single residence sewage treatment plant.

BACKGROUND

There are known wetland type sewage treatment plants with ground and root filter and horizontal or vertical flow of sewage, where the filter bed is composed of layers of gravel and sand. In sewage treatment plants of this type the top filter layer is planted with common reed or other hydrophilic vegetables. An oxygenic zone is created around the vegetable roots in result of oxygen transport to the roots through the shoots. Outside the oxygenic zone created in direct vicinity of the roots, there is an anoxic zone where anaerobic microorganisms are growing. The existence of the oxygenic zone and the anoxic zone results in increasing the diversity of microorganisms taking part in decomposition of sewage constituents, including oxidation of organic substance, nitrification, denitrification, and binding of phosphorus. The size of a ground and root-based sewage treatment plant depends on the quantity of inflowing sewage. Too small amount of sewage may result in withering of vegetables. Too big amount of sewage, as well as flooding with rainfall, may result in insufficient treatment of sewage and clogging of filter layers. Besides, the filter bed structure should provide adequate conditions for growth of microorganisms.

The patent description PL 198680 presents a biological sewage treatment plant with an exposed reservoir equipped with a biological filter bed with vertical flow of sewage. The filter bed consists of a lower layer of gravel, an intermediate layer of sand, and an organic top layer planted with swampy vegetation. The initially treated sewage is being collected by a drainage located at the bottom of the exposed reservoir, and directed gravitationally to a denitrification pond located below. The treated post-sewage water is directed to an inspection well. A disadvantage of this type of sewage treatment plant is the relatively large area of land, the reduced efficiency in winter season, and the gradual reduction of sorption ability, especially of the top layer.

The patent description U.S. Pat. No. 4,415,450 presents a method of sewage treatment using microorganisms and hydrophilic vegetation, where the sewage is subjected to initial treatment in anoxic conditions in a rotting tank for a period of 6 to 24 hours, and the effluent is directed to a filter bed with ascending flow. Thus the sewage is subjected to the action of microorganisms located in the lower part of the filter bed in the anoxic zone, and then to decomposition in the oxygenic zone. In the example of a sewage treatment plant presented in this solution, the lower layer of the filter bed contained rock aggregate of size 7.5 to 15 cm, the middle layer contained aggregate of size 2.5-7.5 cm, and the top layer contained gravel. Such structure of the bed results in shortening the time of sewage retention in the bed, irregular distribution of sewage in the bed, washing out of microorganisms, and flooding of the bed with precipitation.

SUMMARY

The goal of the invention is to increase the efficiency of the constructed wetland sewage treatment system with ground and root filter by increasing the utilization of oxygenic and anoxic zones, and by providing adequate conditions for growth of microorganisms and hydrophilic vegetables.

The constructed wetland sewage treatment system with ground and root filter, consisting of a rotting sedimentation tank with a particulate solids filter, a distribution well, an exposed reservoir with drainage of PVC pipes and insulation of PVC foil, filled with layers of gravel and sand, planted with hydrophilic vegetables whose root system penetration area is bigger than ⅓ of the filter bed height, and an inspection well at the reservoir outlet, according to the invention is characterised in that the filter bed is composed of three layers, the bottom layer filled with coarse-grained oval gravel, in which at ⅔ of the height a dispersal drain connected with a single supply pipe to the distribution well and terminated with a ventilation chimney is laid, the intermediate layer filled with fine-grained oval gravel, and the top layer filled with sand, in which at half of the height a collecting drain with an outlet to the inspection well is laid, where the level of the sewage in the rotting sedimentation tank, being directed gravitationally to the reservoir through the supply pipe, is located below the level of the collecting drain. Moreover, the dispersal drain has transverse slots executed on the side part of the drain circuit.

Advantageously, the bottom layer is made of gravel of fraction 8-16 mm, and the intermediate layer is made of gravel of fraction 4-8 mm.

Advantageously, the top layer is made of sand of fraction 0.05-4 mm.

Advantageously, each layer has the same height, especially 1 m, with tolerance of +−10%.

Advantageously, the exposed reservoir constitutes a narrow-space excavation with inclined walls and rectangular bottom.

Advantageously, the volume of the filter bed in the exposed reservoir is from 10 to 12 times the volume of the rotting sedimentation tank.

Advantageously, the collecting drain is laid horizontally in the shape of a coil, especially a spiral one, with one end connected to the outlet to the inspection well at the outlet of the reservoir, where the collecting drain is laid at the distance of at least five diameters from the reservoir walls and the adjacent sections of the coil.

In an advantageous execution of the sewage treatment plant, the dispersal drain is laid along the reservoir walls, most advantageously at the distance of three drain diameters from the walls, the transverse slots are oriented vertically, the distance between the slots is from 0.8 to 1.5 times the drain diameter, and their width is less than the fraction of gravel in the intermediate layer.

In a solution according to the invention, the ground and root filter structure ensures optimum conditions for growth of microorganisms and upkeep of hydrophilic vegetation. The location of the dispersal drain ensures advantageous conditions for growth of anaerobic microorganisms in the bottom layer, including below the drain. The location of the collecting drain ensures a stable level of the sewage kept in the reservoir. Moreover, the filter structure executed in such a way ensures an adequate hydraulic pressure and reception of sewage through the collecting drain with an outlet located above the supply pipe and the level of the sewage in the rotting sedimentation tank. The narrow-space reservoir occupies a small area, approximately three times smaller in relation to other wetland type sewage treatment plants of comparable treatment efficiency.

BRIEF DESCRIPTION OF THE DRAWINGS

The object of the invention is depicted in an example of execution in the drawings where.

DETAILED DESCRIPTION OF THE PREFERRED EMBODIMENTS

Figure 1:
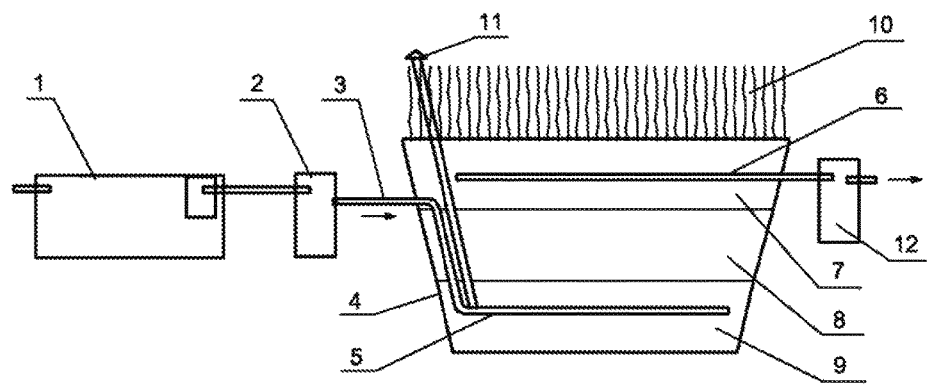
FIG. 1 presents the sewage treatment plant in a side view with a cross-section of the reservoir with ground and root filter.

As presented in FIG. 1, the vegetable-based sewage treatment plant consists of the rotting sedimentation tank 1 with a particulate solids filter, the distribution well 2, and the exposed reservoir 4 with drainage of PVC pipes and a ground and root filter. The volume of the filter bed in the exposed reservoir 4 is from 10 to 12 times the volume of the rotting sedimentation tank 1. The exposed reservoir 4 constitutes a narrow-space excavation with inclined walls and rectangular bottom. The reservoir 4 is insulated from the ground using PVC foil of thickness at least 0.5 mm, laid on the bottom and on the walls of the excavation. The ground and root filter is composed of two layers of gravel and a layer of sand planted with hydrophilic vegetation 10. Each layer has the same height, with tolerance of +−10%, most advantageously 1 m. The bottom layer 9 is filled with coarse-grained oval gravel of fraction 8-16 mm, where the dispersal drain 5 is laid at ⅔ of the height. The dispersal drain 5 is connected with the supply pipe 3 to the distribution well 2. The end of this drain is connected to the ventilation chimney 11. The intermediate layer 8 is filled with fine-grained oval gravel of fraction 4-8 mm. The top layer 7 is filled with sand of fraction 0.05-4 mm, in which the collecting drain 6 with an outlet to the inspection well 12 is laid at half of the height. The dispersal drain 5 and the collecting drain 6 are executed of PVC pipes of minimum diameter 100 mm.

Figure 2:
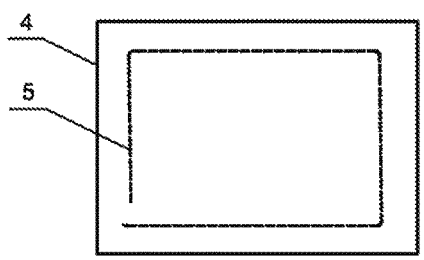
FIG. 2 presents the layout of the dispersal drain within the reservoir outline in a top view.
Figure 3:
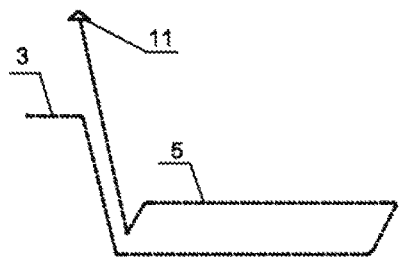
FIG. 3 presents the layout of the dispersal drain with the supply pipe and the chimney in a perspective view.
Figure 5:
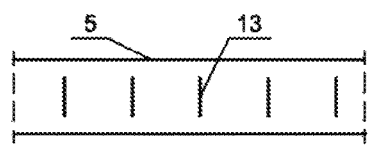
Figure 6:
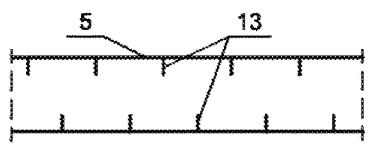
FIG. 6 presents a fragment of the drain in a top view.

As presented in FIG. 2, the dispersal drain 5 is laid along the walls of the reservoir 4 at the distance of approximately three drain diameters from the walls, or at a distance equal to approximately ⅓ of the thickness of the bottom layer 9, which is minimum 30 cm from the walls. The connection of the dispersal drain 5 to the supply pipe 3 and the ventilation chimney 11 is presented in a perspective view in FIG. 3. The ventilation chimney 11 is used for venting the drain. Location of the ventilation chimney 11 at the end of the drain causes a shuttle motion of the supplied sewage, which prevents the drain from silting up. The transverse slots 13, shown in FIG. 5, 6, are executed on the side part of the dispersal drain 5 circuit. The transverse slots 13 in this layer of drainage are oriented vertically, and the distance between the slots is from 0.8 to 1.5 times the drain diameter. The width of the transverse slots 13 is less than the fraction of gravel in the intermediate layer 8 and it is from 1 to 4 mm.

Figure 4:
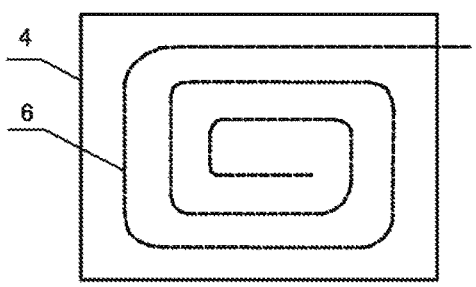
FIG. 4 presents the layout of the collecting drain within the reservoir outline in a top view, FIG. 5 present a fragment of the drain in a side view.

As presented in FIG. 4, the collecting drain 6 is laid horizontally in a shape similar to a spiral coil. One end of the drain is connected with an outlet to the inspection well 12. The collecting drain 6 is laid at the distance of at least five diameters from the walls of the reservoir 4 and the adjacent sections of the coil. The level of the sewage in the rotting sedimentation tank 1 and the horizontal section of the supply pipe 3 at the outlet to the reservoir 4 is located below the level of the collecting drain 6 and its outlet at the outlet from the reservoir 4.

The purpose of the rotting sedimentation tank 1 is to subject the raw sewage to initial treatment in a process of anaerobic fermentation, and to separate the solid parts of the raw sewage. The size of the rotting sedimentation tank 1 is directly proportional to the size of emitted sewage and it is equal to minimum ⅔ of the average emission of raw sewage of five days. The purpose of the inspection well is to buffer the sewage in order to supply it uniformly to the ground and root filter. The inspection well 12 with a bottom outlet is used for maintaining an adequate level of humidity in the filter bed, and for directing the excess sewage to the receiver. Such receiver can be a retention pond, a dry well, ground drainage, a drainage ditch, natural reservoirs or watercourses.

A sewage treatment plant according to the invention, in comparison to other sewage treatment plants with ground and root filter, occupies an area that is three times smaller, at similar efficiency of sewage treatment. The ground and root filter structure provides optimum conditions for growth of microorganisms, especially in the near-bottom layer below the dispersal drain, and an adequate hydraulic pressure of the sewage inside the reservoir. The constant level of the sewage kept in the reservoir results in easier upkeep of the hydrophilic vegetation. The ground and root filter can be made of easily available local materials, which results in low construction costs. The reservoir construction and the filter structure ensures reliability and durability in a longer period of operation. The top layer 7 of the filter can be planted with local hydrophilic vegetation whose root system penetration area is bigger than ⅓ of the filter bed height. The prototype sewage treatment plant according to the invention was planted with common reed *Phragmites australis*. The planting density was 8 pieces per square meter.

What is claimed is:
1. A constructed wetland sewage treatment system with ground and root filter, comprising:
   a rotting sedimentation tank with a particulate solids filter,
   a distribution well,
   an exposed reservoir with drainage of PVC pipes forming a dispersal drain and a collecting drain and insulation of PVC foil, filled with layers of gravel and sand, planted with hydrophilic vegetation whose root system penetration area is bigger than ⅓ of the filter bed height, and
   an inspection well at the reservoir outlet,
   wherein the filter bed is composed of three layers,
      the bottom layer (9) filled with coarse-grained oval gravel, in which the dispersal drain (5) is laid along the reservoir walls at ⅔ of the height connected with a single supply pipe (3) to the distribution well (2) and terminated with the ventilation chimney (11),
      the intermediate layer (8) filled with fine-grained oval gravel, and the top layer (7) filled with sand, in which the collecting drain (6), having an outlet to the inspection well (12), is laid horizontally in the shape of a coil at half of the height, where the level of the sewage in the rotting sedimentation tank (1), directed gravitationally to the reservoir (4) through the supply pipe (3), is located below the level of the collecting drain (6), and moreover, the dispersal drain (5) has transverse slots (13) executed on the side part of the drain pipe circumference.

2. The system of claim 1, wherein the bottom layer (9) is executed of gravel of fraction 8-16 mm, and the intermediate layer (8) is executed of gravel of fraction 4-8 mm.

3. The system of claim 1, wherein the top layer (7) is executed of sand of fraction 0.05-4 mm.

4. The system of claim 1, wherein each layer has the same height, advantageously 1 m, with tolerance of +−10%.

5. The system of claim 1, wherein the exposed reservoir (4) constitutes a narrow-space excavation with inclined walls and rectangular bottom.

6. The system of claim 1, wherein the volume of the filter bed in the exposed reservoir (4) is from 10 to 12 times the volume of the rotting sedimentation tank (1).

7. The system of claim 1, wherein the collecting drain (6) is laid in the shape of a coil, advantageously a spiral one, with one end connected to the outlet to the inspection well (12) at the outlet from the reservoir (4), where the collecting drain (6) is laid at the distance of at least five diameters from the reservoir walls (4) and the adjacent sections of the coil.

8. The system of claim 1, wherein the dispersal drain (5) is laid along the reservoir walls (4) at the distance of three drain diameters from the walls.

9. The system of claim 1, wherein the transverse slots (13) are oriented vertically, where the distance between the slots is from 0.8 to 1.5 times the drain diameter.

10. The system of claim 1, wherein the width of the transverse slots (13) is less than the fraction of gravel in the intermediate layer (8).

* * * * *